United States Patent [19]
Posta

[11] Patent Number: 5,388,130
[45] Date of Patent: Feb. 7, 1995

[54] STEAM GENERATOR LOCATED OUTSIDE NUCLEAR POWER PLANT PRIMARY CONTAINMENT

[76] Inventor: Bekeny Posta, 3 Jasmine La., San Rafael, Calif. 94903

[21] Appl. No.: 171,322

[22] Filed: Dec. 21, 1993

[51] Int. Cl.[6] .............................................. G21C 13/00
[52] U.S. Cl. .................................... 376/293; 376/277
[58] Field of Search ................................ 376/273–276, 376/283, 294–296, 402, 277, 293

[56] References Cited

U.S. PATENT DOCUMENTS

| | | | |
|---|---|---|---|
| 3,712,851 | 1/1973 | Isberg et al. | 376/273 |
| 3,901,196 | 8/1975 | Dorner et al. | 122/510 |
| 3,937,651 | 2/1976 | Schabert et al. | 376/283 |
| 4,038,134 | 7/1977 | Dorner et al. | 376/293 |
| 4,050,983 | 9/1977 | Kleimola | 376/293 |
| 4,057,077 | 11/1977 | Schabert et al. | 137/861 |
| 4,080,256 | 3/1978 | Braun et al. | 376/293 |
| 4,187,146 | 2/1980 | Shen et al. | 376/298 |
| 4,473,528 | 9/1984 | Kleimola | 376/282 |
| 4,587,080 | 5/1986 | Johnson | 376/282 |
| 4,654,190 | 3/1987 | Schlonski | 376/282 |
| 4,666,662 | 5/1987 | Loose et al. | 376/315 |
| 4,687,625 | 8/1987 | Hasegawa et al. | 376/292 |
| 4,687,626 | 8/1987 | Tong | 376/298 |
| 4,702,879 | 10/1987 | Tower et al. | 376/282 |
| 4,765,946 | 8/1988 | Dagard et al. | 376/282 |
| 4,919,882 | 4/1990 | Aul et al. | 376/293 |
| 5,006,303 | 4/1991 | Rowlands | 376/282 |
| 5,053,188 | 10/1991 | Niino et al. | 376/277 |
| 5,053,190 | 10/1991 | Gardner et al. | 376/366 |
| 5,148,681 | 9/1992 | Lagache | 62/48.1 |
| 5,158,742 | 10/1992 | Dillmann | 376/299 |

OTHER PUBLICATIONS

Snyder, C. R. "The Potential For Small Light Water Reactor Power Plants," Technical Research & Development Interim Report 3-2-3-10, Dec. 1980.

*Primary Examiner*—Daniel D. Wasil
*Attorney, Agent, or Firm*—Townsend and Townsend Khourie and Crew

[57] ABSTRACT

The Pressurized Water Reactor (PWR) plant steam generators, which are normally located inside the primary containment, are located outside, in separate structures. This arrangement provides for the removal or repair of the individual "leaky" steam generators, while the others remain operational. It also significantly reduces the size and thereby the cost of the containment.

12 Claims, 2 Drawing Sheets

STEAM GENERATOR LOCATED OUTSIDE NUCLEAR POWER PLANT PRIMARY CONTAINMENT

BACKGROUND OF THE INVENTION

This invention relates to the basic arrangement of nuclear power plants; in particular, to the arrangement of Pressurized Water Reactor (PWR) plants.

Besides the reactor, typical PWR plants have steam generators located inside a containment structure as shown in FIG. 1. The steam generator is a heat exchanger between the "primary loop" radioactive reactor coolant and the non-radioactive "secondary loop". In a PWR, the primary loop is sufficiently pressurized to suppress steaming. Recirculation pumps are used to circulate the hot water between the steam generators and the reactor. In the secondary loop, the feedwater pumps provide the clean water to the steam generators. The clean water is evaporated in the steam generator to provide clean steam to drive the turbines. The steam turbines rotate the electric generator.

In contrast to PWR plants, traditional Boiling Water Reactor (BWR) Plants do not have steam generators. In a BWR plant, the reactor provides radioactive steam directly to the steam turbines as shown in FIG. 2. This arrangement saves the expense of the steam generators and avoids the heat transfer inefficiencies, caused by the steam generators. On the other hand, BWR plants are faced with the problem of having radioactive steam in the secondary loop, necessitating shielding and restricting maintenance during operation.

Experience has shown that over time cracks develop in the thin-walled PWR steam generator tubes, causing radioactive steam leakage to the clean secondary loop. When significant radiation is detected in the secondary loop, the plant is shut down while the leaking tubes are plugged. After about ten percent of the tubes are plugged, or after frequent shut-downs, the steam generator is replaced or re-tubed. This operation results in a several-month-long down-time and is the most frequent problem encountered in present PWR plants. The expense of shutting down for months to replace the steam generators is so significant that it has led to the premature decommissioning of several plants, e.g. Trojan Generating Station in Portland, Oreg. Any improvement in steam generator life extension or ease of replacement is desirable. Better water quality, new tube materials, better manufacturing and quality procedures are the long touted panaceas for tube life extension. However, these solutions have resulted in only limited success. Consequently, plants are frequently shut down for extended periods of time for steam generator repair and replacement.

SUMMARY OF THE INVENTION

The invention provides an improved nuclear power plant arrangement to facilitate easy repair or replacement of the steam generators. The invention provides locating of the steam generators for PWR plants outside the containment structure, each in a separate compartment. This arrangement provides for the removal of the individual "leaky" steam generators, while the others remain operational. Having to reduce only the power output during steam generator repair or replacement, in lieu of shutting the plant down, results in reduction of lost generating capacity. This is even more desirable now, as the required life span for nuclear plants has recently been increased from 30 to 60 years, based on plant economics. Having the steam generators located outside the containment also results in significant reduction of the containment size and thereby its initial cost.

The invention also provides relief valves or blow-out panels in the structure containing the steam generators for releasing any unexpected release of radioactive steam from the generators. Isolation valves are also provided between the generators and the reactor. These valves can be configured to automatically close in the event of an unexpected release of steam, or can be closed when performing an on-line replacement of the steam generators. The containment may also be connected to the steam generator compartment to allow unexpected release of steam from the steam generators to be directed into the containment.

A further understanding of the nature and advantages of the invention herein may be realized by reference to the remaining portions of the specification and the attached Figures.

DESCRIPTION OF THE PREFERRED EMBODIMENT

Figure 1:
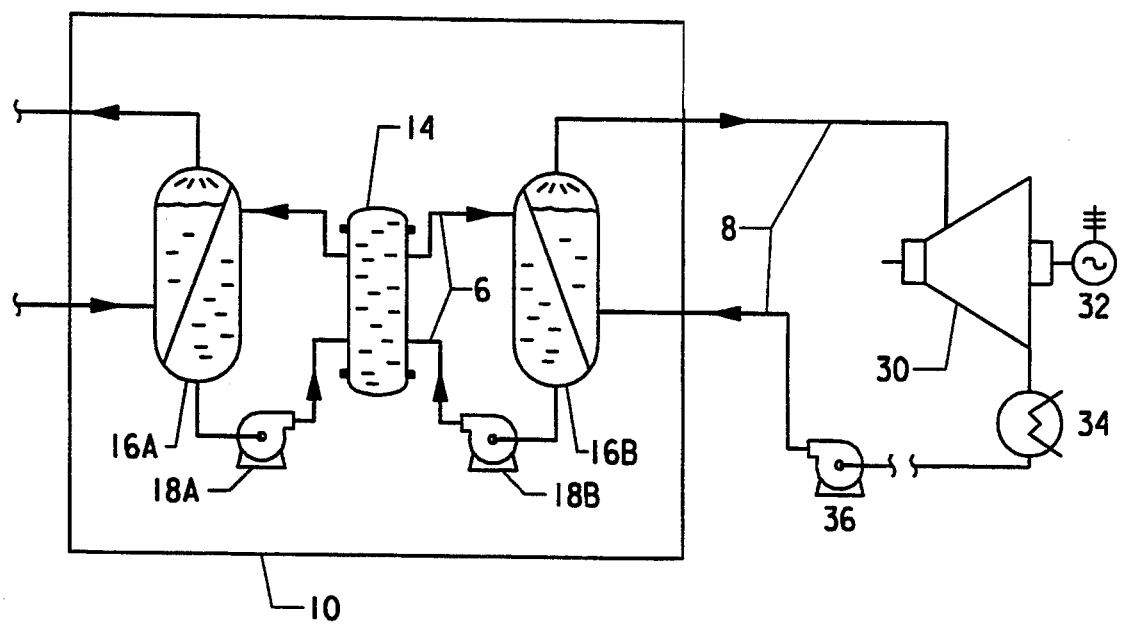
FIG. 1 is a schematic diagram illustrating a typical prior art PWR plant design.

Presently all PWR plants with pressure-retaining containments have steam generators located inside the containment, as shown in FIG. 1. Following a primary loop-break, most of the radioactivity is kept inside the containment. Many of the existing PWR plants, however, are not provided with automatic containment isolation valves and rely on the steam generator tubes to form part of the containment barrier. As a result, steam generator tube leaks cause increased containment outleakage following a Loss of Coolant Accident (LOCA). Also, repair or replacement of a steam generator because of "leaky" tubes requires plant shut-down and results in loss of power generation.

The invention provides for on-line replacement of PWR steam generators by locating the generators external to the containment. As is known in the art, the containment is typically a reinforced concrete or steel structure encompassing the reactor, some supporting equipment, and the steam generators. Within the containment, the reactor and the generators may also be enclosed in additional, but cross-connected protective structures which remain at the same pressure at all times. However, the present invention is concerned primarily with placement of the reactor and the steam generators relative to the overall containment in completely separated or isolatable compartments.

One embodiment of the invention locates only the steam generators outside of the containment in individual compartments. The separate compartments containing the steam generators will be physically separated from the containment containing the reactor so that the steam generators may be serviced and maintained without affecting the operation of the reactor. Another embodiment also locates the recirculation pumps outside the containment, in shared compartments with the steam generators. In both embodiments, the compartments are provided with blow-out panels to release steam pressure to the outside atmosphere in case of a line break in the compartment. The discharge can be direct or through a stack to minimize off-site dose effects.

The specific containment size is determined by the amount of energy stored inside the containment at the initiation of a LOCA and, to a lesser extent, by the reactor core decay heat. The containment size is therefore the result of a cost optimization, based on the inverse relation between size and pressure. Hence, significant reduction in containment size and cost can be realized by moving the steam generators, which are one of the major energy sources, outside the containment.

According to one aspect of the invention, fast-acting inboard and outboard isolation valves are added to the primary loop pipes. These valves penetrate the containment wall and function in a manner similar to the function of main steam isolation valves in a BWR following a LOCA. The valves close in the case of either an inside or outside containment primary-loop-break. This maintains the radiation dose consequences below the 10CFR Part 100 regulatory limits. In case of an inside containment break, i.e. a LOCA, the valves close in all piping connecting the reactor with the steam generators, while in case of an outside containment break only the affected steam generator is isolated.

Alternatively, if containment size is not an issue, the valves do not need to be closed in the case of an inside containment break because the steam generator tubes form part of the containment. Thus, the valves would only need to be closed when performing on-line replacement of the steam generators.

An outside containment break in the present invention would result in a slightly higher radiation dose release than the same break occurring in a BWR plant. Typically, the radiation release would be closer to the post LOCA release of a PWR plant. This assumes that the level of radioactivity in the primary loop is based on the maximum operational fuel-leak-limits allowed by the existing PWR technical specifications. However, the clean up after a steam generator break would be easier as it does not result in a LOCA and the contamination of the containment. A higher number of steam generators reduce the amount of steam and consequently the radioactivity released following an outside containment break.

The specific seismic and quality requirements of the outside containment equipment, piping and the structure which houses the steam generators will vary based on the licensing approach. Such requirements are known in the art.

Referring now to FIG. 1, a typical prior art PWR design is shown. The containment 10 houses a reactor 14, steam generators 16A and B, and recirculation pumps 18A and B. The reactor 14, steam generators 16A and B, recirculating pumps 18A and B, and the connecting piping form the primary loop 6, which is radioactive. The steam generators 16A and B generate clean, non-radioactive steam for the turbine 30 (or other non-radioactive steam user), which is located outside the containment 10. The steam then drives an electric generator 32 which is connected to a secondary loop 8. The steam leaving the turbine 30 condenses in the condenser 34, and then returns as water to the steam generator 16 through a feedpump 36.

Figure 2:
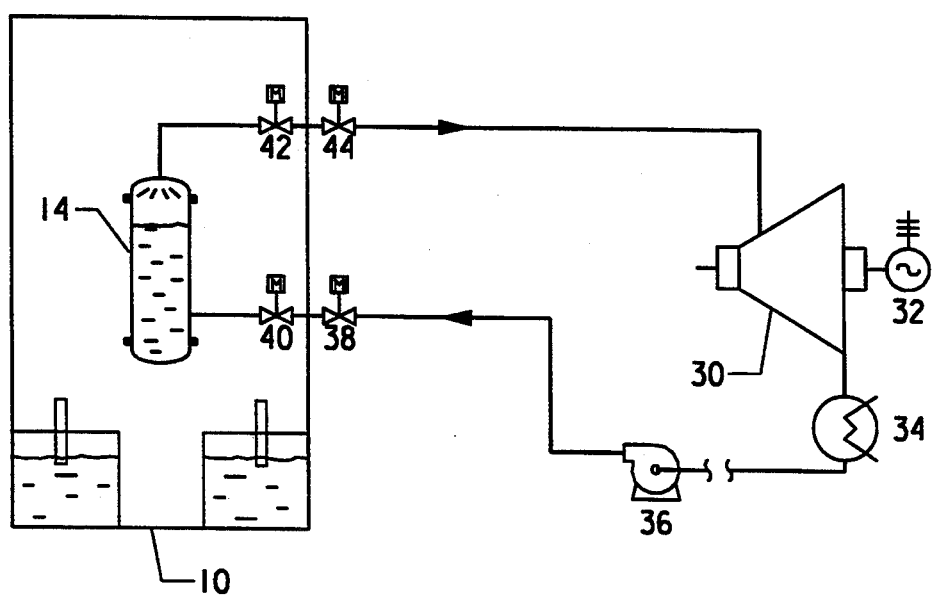
FIG. 2 is a schematic diagram illustrating a typical prior art BWR plant design.

FIG. 2 illustrates a typical prior art BWR design. The containment 10 houses the reactor 14. The radioactive steam flows from the reactor 14 through a main steam inboard isolation valve 42 and a main steam outboard isolation valve 44 directly to the steam turbine 30, which drives the electric generator 32. The steam leaving the turbine condenses in the condenser 34, and then returns as water to the reactor 14 through the feedpump 36, the feedwater outboard isolation valve 38 and the inboard isolation valve 40.

Figure 3:
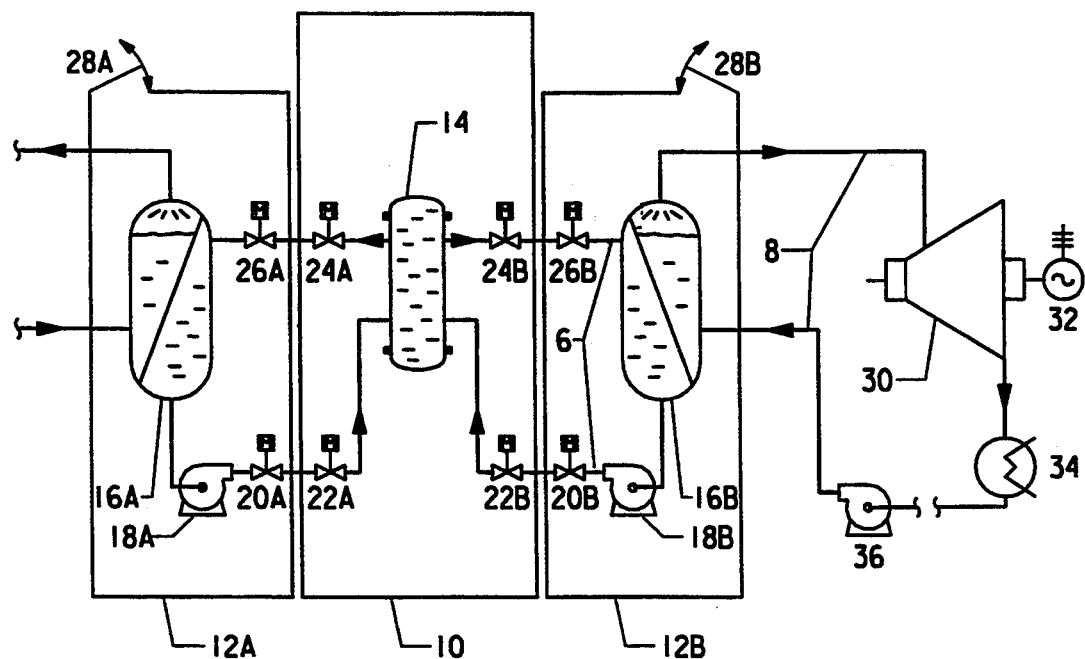
FIG. 3 is a schematic diagram illustrating an improved nuclear power plant arrangement according to the principles of the present invention.

FIG. 3 illustrates one embodiment of the invention wherein the steam generators 16A and B are located outside the containment 10. The arrangement schematically illustrates the reactor 14 inside the containment 10 and two steam generators 16A and B in two separate steam generator compartments 12A and B. The recirculation pumps 18A and B circulate the primary coolant water from the steam generators 16A and B, through the primary coolant outboard isolation valves 20A and B, and through inboard isolation valves 22A and B to the reactor 14. After the water is heated in the reactor 14, it returns through the primary coolant inboard isolation valves 24A and B, and through outboard isolation valves 26A and B to the steam generators 16A and B. The path connecting the reactor 14 to the steam generators 16A and B, including the necessary piping, as just discussed form the primary loop 6, which is radioactive. The clean, non-radioactive side of the steam generators 16A and B provides the clean steam to the steam turbine 30, which is located outside the containment 10, to drive the electric generator 32 and is part of the secondary loop 8. The steam leaving the turbine 30 condenses in the condenser 34, and then returns as water to the steam generators 16A and B through the feedpump 36. The steam generator compartments 12A and B are both provided with blowout panels 28A and B to release compartment pressure in case of a pipe break.

During normal plant operation, valves 20A and B, 22A and B, 24A and B, and 26A and B shown in FIG. 3 are open. During a LOCA, which is the result of a pipe break inside containment 10, the valves 20A and B, 22A and B, 24A and B, and 26A and B close automatically to minimize radiation release from the containment. In case of a steam generator 16A or connected pipe leak, or break, the associated valves 20A, 22A, 24A and 26A close automatically to limit the amount of reactor coolant release. If the leak is larger than the amount that the heating and ventilating system is capable of handling, then the blow-out panels 28A and B blow and release the steam pressure from the room. Alternatively, pressure relief valves may be used in lieu of blow out panels to release the pressure from the steam generator compartments.

During repair or replacement of a steam generator 16A or recirculation pump 18A, the associated valves 20A, 22A, 24A and 26A are manually closed. However, the other steam generator 16B and the plant remain operational.

Although the above description contains many specificities, these should not be construed as limiting the scope of the invention but as merely providing illustrations of some of the presently preferred embodiments of this invention. It can be seen by those with skill in the art of designing nuclear power plants, that many of the details are not shown and that variations in the number of components, their arrangements and relative relationships, can be changed while the basic concept remains the same. For example, the steam generator compartments can be cross-connected and sized large enough to contain the release from one or more of the steam generators without release to the outside. Alternatively, a release from a steam generator break can be contained by cross-connecting the steam generator compartments with the containment that houses the reactor. With this configuration, the cross-connection should be kept closed, or closed immediately upon a pipe break inside the containment, to contain any radiation and pressurization effects resulting from such a break.

Accordingly, it can be seen that the above arrangement allows for the replacement or repair of steam generators at reduced power level, in lieu of plant shut-down. The invention also allows for the replacement or repair of recirculation pumps at reduced power level, in lieu of plant shut-down. Further, the present invention reduces the size and the cost of the containment. Moreover, by providing positive containment isolation, the invention eliminates reliance on steam generator tube integrity for limiting the leakage to outside containment following a LOCA.

What is claimed is:

1. A PWR nuclear power plant arrangement comprising:
   a reactor located within a primary containment;
   at least a first steam generator connected to said reactor, said first generator located outside said primary containment in a structure, said reactor located outside said structure; and
   a non-radioactive steam user connected to said first steam generator, whereby said generator may be disconnected from said reactor without interrupting the operation of said reactor.

2. The arrangement as in claim 1, further comprising a plurality of steam generators connected to said reactor and located outside said primary containment and a plurality of structures for housing said steam generators.

3. The arrangement as in claim 1, wherein said structure containing said generator comprises means for releasing radioactive steam from said structure, whereby radioactive steam released from said generator can escape into the atmosphere without affecting said primary containment or said reactor.

4. The arrangement as in claim 3, wherein said releasing means comprises at least one release valve.

5. The arrangement as in claim 3, wherein said releasing means comprises at least one blow-out panel.

6. The arrangement as in claim 1, further comprising at least one isolation valve between said generator and said reactor.

7. The arrangement as in claim 1, further comprising:
   a first and a second automatic valve forming a first pair of automatic valves connected to a first pipe connecting said reactor with said generator, said pipe transporting fluid from said reactor to said generator, said first valve located within said primary containment, and said second valve located outside said primary containment; and
   a third and a fourth automatic valve forming a second pair of automatic valves connected to a second pipe connecting said generator with said reactor, the pipe transporting fluid from said generator to said reactor, said third valve located outside said primary containment, and said fourth valve located within said primary containment;
   said first and second pair of valves being configured to automatically close upon unexpected escape of said fluid within said primary containment, whereby radiation released from said primary containment is minimized.

8. The arrangement as in claim 1, further comprising:
   a first and a second automatic valve forming a first pair of automatic valves connected to a first pipe connecting said reactor with said generator, said pipe transporting fluid from said reactor to said generator, said first valve located within said primary containment, and said second valve located outside said primary containment; and
   a third and a fourth automatic valve forming a second pair of automatic valves connected to a second pipe connecting said generator with said reactor, the pipe transporting fluid from said generator to said reactor, said third valve located outside said primary containment, and said fourth valve located within said primary containment;
   said first and second pair of valves being configured to automatically close upon unexpected escape of said fluid outside said primary containment, whereby reactor coolant release is limited.

9. The arrangement as in claim 1, further comprising:
   a first and a second automatic valve forming a first pair of automatic valves connected to a first pipe connecting said reactor with said generator, said pipe transporting fluid from said reactor to said generator, said first valve located within said primary containment, and said second valve located outside said primary containment; and
   a third and a fourth automatic valve forming a second pair of automatic valves connected to a second pipe connecting said generator with said reactor, the pipe transporting fluid from said generator to said reactor, said third valve located outside said primary containment, and said fourth valve located within said primary containment;
   said first and second pair of valves being closable upon on-line replacement of said generator.

10. The arrangement as in claim 1, wherein said structure containing said generator is sized to contain a release of radioactive material from said generator without release to the atmosphere.

11. The arrangement as in claim 1, wherein said structure containing said generator is connected by at least one pipe to said primary containment, said pipe being closable upon unexpected escape of said fluid within said primary containment.

12. An improved PWR nuclear power plant arrangement of the type comprising a reactor, at least one steam generator connected to said reactor, said reactor being confined in a primary containment, and a turbine connected to said steam generator wherein the improvement comprises:
   a separate compartment for housing said generator, said separate compartment being essentially isolatable from the primary containment and accessible from outside said primary containment, whereby said generator may be disconnected from said reactor without shutting down said reactor.

* * * * *